United States Patent
Glavicic

(10) Patent No.: US 10,845,321 B2
(45) Date of Patent: Nov. 24, 2020

(54) TEMPERATURE DETERMINATION USING RADIATION DIFFRACTION

(71) Applicant: Rolls-Royce Corporation, Indianapolis, IN (US)

(72) Inventor: Michael George Glavicic, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 142 days.

(21) Appl. No.: 16/139,901

(22) Filed: Sep. 24, 2018

(65) Prior Publication Data
US 2019/0094161 A1 Mar. 28, 2019

Related U.S. Application Data

(60) Provisional application No. 62/563,897, filed on Sep. 27, 2017.

(51) Int. Cl.
*G01N 23/207* (2018.01)
*G01K 11/30* (2006.01)
(Continued)

(52) U.S. Cl.
CPC ........... *G01N 23/207* (2013.01); *G01K 11/30* (2013.01); *G01N 23/2055* (2013.01);
(Continued)

(58) Field of Classification Search
CPC .. G01N 23/005; G01N 23/20; G01N 23/2055; G01N 23/205; G01N 2223/056;
(Continued)

(56) References Cited

U.S. PATENT DOCUMENTS 5,353,236 A * 10/1994 Subbiah ................ G01N 23/20
700/266
6,005,913 A 12/1999 Zombo et al.
(Continued)

FOREIGN PATENT DOCUMENTS

EP 0291320 A2 11/1988
GB 2168805 A 6/1986

OTHER PUBLICATIONS

Aba-Perea et al., "Determination of the high temperature elastic properties and diffraction elastic constants of Ni-base superalloys", Materials and Design 89 (2016) 856-863, Sep. 30, 2015, 8 pgs.
(Continued)

*Primary Examiner* — Chih-Cheng Kao
(74) *Attorney, Agent, or Firm* — Shumaker & Sieffert, P.A.

(57) ABSTRACT

A system includes a focusing system, a radiation detector, and a controller. The focusing system is configured to receive an incident radiation beam from a radiation source and focus the incident radiation beam on a portion of a component of a high temperature mechanical system. The incident radiation beam scatters from the portion of the component as a diffracted radiation beam. The focusing system is further configured to focus the diffracted radiation beam from the portion of the component on the radiation detector. The radiation detector is configured to detect a diffraction pattern of the diffracted radiation beam from the portion of the component. The controller is configured to determine a temperature of the portion of the component based on the diffraction pattern.

18 Claims, 5 Drawing Sheets

(51) Int. Cl.
*G01N 23/2055* (2018.01)
*G01N 23/20* (2018.01)

(52) U.S. Cl.
CPC ... *G01N 23/2073* (2013.01); *G01N 23/20075* (2013.01); *G01N 2223/63* (2013.01)

(58) Field of Classification Search
CPC ......... G01N 2223/0566; G01N 23/207; G01N 23/2073; G01N 2223/63; G01K 11/30
See application file for complete search history.

(56) References Cited

U.S. PATENT DOCUMENTS

| | | | |
|---|---|---|---|
| 6,269,144 B1* | 7/2001 | Dube | G01N 23/20 378/71 |
| 2004/0170250 A1* | 9/2004 | Verman | G21K 1/04 378/84 |
| 2005/0031073 A1* | 2/2005 | Radley | G01N 23/083 378/47 |
| 2006/0062351 A1* | 3/2006 | Yokhin | G01N 23/20008 378/86 |
| 2011/0310384 A1 | 12/2011 | Georgakoudi et al. | |
| 2016/0349115 A1* | 12/2016 | Wu | G01N 23/20 |
| 2017/0131224 A1* | 5/2017 | Paulus | G01N 23/20083 |
| 2017/0169910 A1* | 6/2017 | Jia | G01N 23/20083 |

OTHER PUBLICATIONS

Leggett, "Feasibility Study of Using Neutron Diagnostics for Turbine Engine Structural Measurements", Feb. 1994, 107 pgs.
Extended Search Report from counterpart European Application No. 18191270.0, dated Feb. 22, 2019 8 pp.

* cited by examiner

TEMPERATURE DETERMINATION USING RADIATION DIFFRACTION

This application claims the benefit of U.S. Provisional Application No. 62/563,897, filed Sep. 27, 2017, which is incorporated herein by reference in its entirety.

TECHNICAL FIELD

The disclosure relates to methods and systems for determining a temperature of a component.

BACKGROUND

Test systems may determine properties, such as temperature, mechanical stress, or the like, of gas turbine engine components for various operating conditions of the gas turbine engine. These properties may be used to configure operating parameters, manufacturing parameters, or the like, of the gas turbine engine. However, these test systems may be limited in their ability to accurately determine properties due to instrumentation limitations of the test systems. For example, a temperature probe may receive an accurate temperature reading for a surface of the component, but may not receive an accurate temperature reading for a volume of the component beneath the surface of the component. This inaccuracy may reduce an operating threshold at which the gas turbine engine may be operated to avoid damage to the gas turbine engine.

SUMMARY

In some examples, the disclosure describes a method that includes receiving, by a focusing system, an incident radiation beam from a radiation source and focusing, using the focusing system, the incident radiation beam on a portion of a component of a high temperature mechanical system. The incident radiation beam scatters as a diffracted radiation beam from the portion of the component. The method further includes focusing, using the focusing system, the diffracted radiation beam from the portion of the component on a radiation detector. The method further includes detecting, by the radiation detector, a diffraction pattern of the diffracted radiation beam from the portion of the component. The method further includes determining, by a controller, a temperature of the portion of the component based on the diffraction pattern.

In other examples, the disclosure describes a system that includes a focusing system, a radiation detector, and a controller. The focusing system is configured to receive an incident radiation beam from a radiation source and focus the incident radiation beam on a portion of a component of a high temperature mechanical system. The incident radiation beam scatters from the portion of the component as a diffracted radiation beam. The focusing system is further configured to focus the diffracted radiation beam from the portion of the component on the radiation detector. The radiation detector is configured to detect a diffraction pattern of the diffracted radiation beam from the portion of the component. The controller is configured to determine a temperature of the portion of the component based on the diffraction pattern.

The details of one or more examples are set forth in the accompanying drawings and the description below. Other features, objects, and advantages of the disclosure will be apparent from the description and drawings, and from the claims.

DETAILED DESCRIPTION

Figure 1:
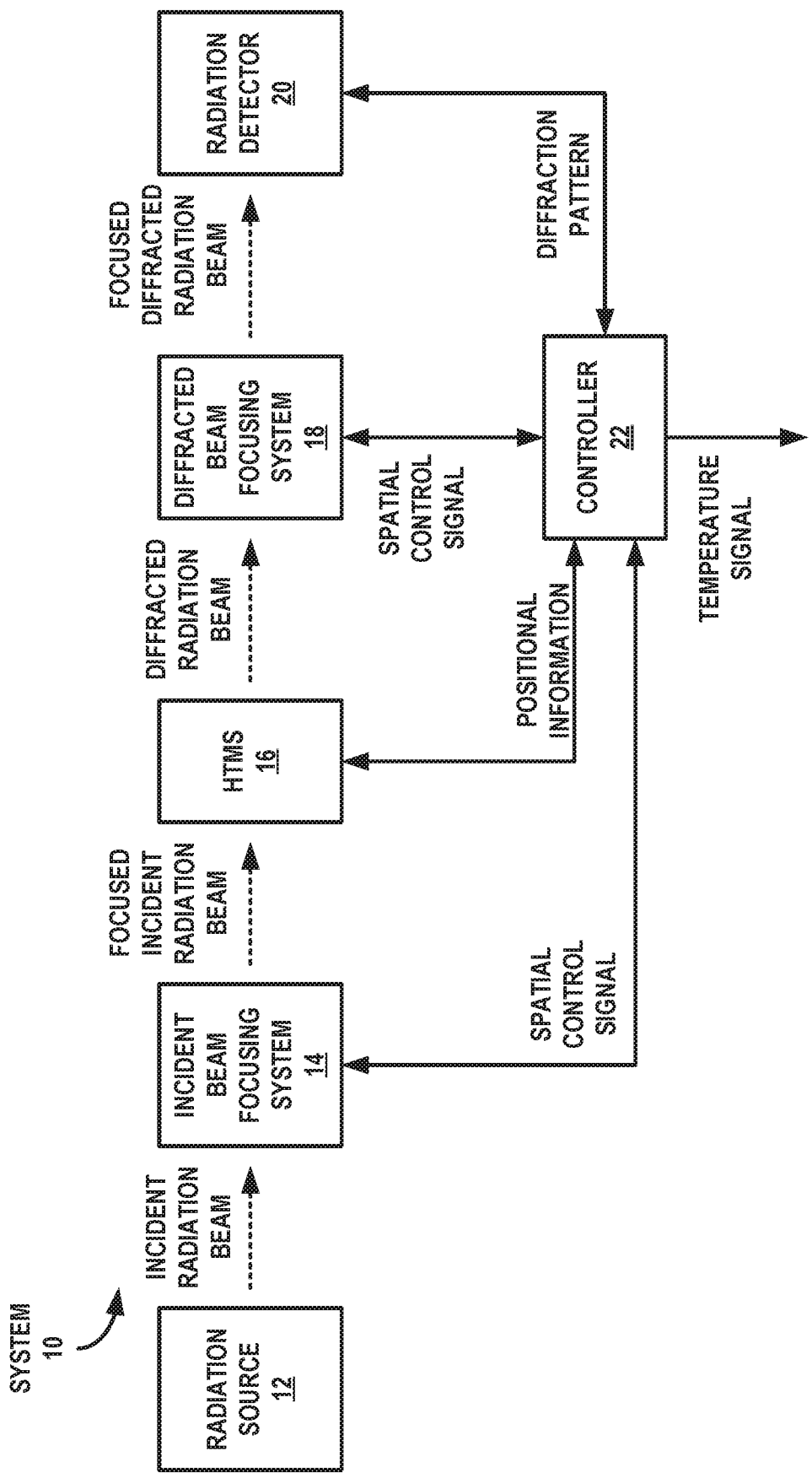
FIG. 1 is a conceptual and schematic block diagram illustrating an example system for determining a temperature of a portion of a component using radiation diffraction.

The disclosure describes systems and techniques for determining a temperature of a portion of a high temperature mechanical system, such as a gas turbine engine, using radiation diffraction.

According to the principles discussed herein, a system may determine a temperature of a portion of a component using radiation diffraction. In solid crystalline materials, such as metals and ceramics, increased vibration occurs with increasing temperature. This increased vibration creates a change in the interplanar distance (d) between the atoms according to the lattice planes of the crystalline material. When radiation passes through the material, the radiation is scattered by the atoms at various scattering angles and in varying radiation fluxes to create a diffraction pattern. Peaks in the radiation flux may indicate constructive interference of the radiation, which correspond to the interplanar distance (d). Properties of the diffraction pattern, such as radiation flux at various scattering angles and/or energies, may be evaluated to determine the interplanar distance of the portion of the material and, correspondingly, the temperature of the portion of the material.

In some examples, a system includes a focusing system, a radiation detector, and a controller. The focusing system may be configured to define a gauge volume of the system that corresponds to a portion of the component of the high temperature mechanical system for which a temperature measurement is made. The focusing system may receive an incident radiation beam from a radiation source and focus the incident radiation beam on a focal portion of a component of high temperature mechanical system. The incident radiation beam scatters from the focal portion of the component as a diffracted radiation beam with a particular diffraction pattern. The focusing system focuses the diffracted radiation beam from the focal portion of the component on the radiation detector. For rotating components, the focusing system may include a gating device that is synchronized to the rotation of the rotating component and gates the diffracted radiation beam according to the rotating component. By controlling both the incident and radiation beams, the focusing system may define a gauge volume in any portion of the high temperature mechanical system.

The radiation detector may detect the diffraction pattern of the diffracted radiation beam from the portion of the component. For example, the radiation detector may detect intensities of the diffracted radiation beam at various diffraction angles or various energies. The controller may determine a temperature of the portion of the component based on the diffraction pattern. For example, the controller may identify an intensity peak of the diffraction pattern and correlate the intensity peak of a wavelength to a particular diffraction angle or the intensity peak of a diffraction angle to a particular energy. The controller may determine the average interplanar spacing of the portion of the component from the diffraction angle or energy associated with the intensity peak and determine the temperature from the average interplanar spacing.

By using focused radiation diffraction to determine a temperature of a portion of a component, the systems and methods described herein may nondestructively test and generate a temperature profile of the component. For example, portions of the component that are not within a line-of-sight of a temperature detector may have a temperature determined with greater accuracy than a temperature detector that is limited to determining a surface temperature. Accurate temperature information may be used for example, by a design system to verify models used to design components or by a control system to develop and/or adapt more accurate models for predicting temperatures of a component of a high temperature mechanical system under various operating conditions.

FIG. 1 is a conceptual and schematic block diagram illustrating an example system 10 for determining a temperature of a portion of a component of a high temperature mechanical system (HTMS) 16 using focused radiation diffraction. System 10 includes an optional incident beam focusing system 14, an optional diffracted beam focusing system, a radiation detector 20, and a controller 22. System 10 may optionally include a radiation source 12. HTMS 16 may be any high temperature mechanical system including, but not limited to, gas turbine engines such as turboprop, turbofan, turboshaft, turbojet, and the like. The component of HTMS 16 may be any component of HTMS 16. Components of HTMS 16 for which a temperature may be determined may include, but are not limited to, stationary components, rotating components, coatings on components, homogeneous components, heterogeneous components, and the like. Components of HTMS 16 for which a temperature may be determined may include components made from a variety of materials that may include, but are not limited to, single crystal alloys, polycrystalline alloys, ceramics, and the like.

In some examples, system 10 may optionally include radiation source 12. Radiation source 12 may be configured to produce an incident radiation beam. Radiation source 12 may include any radiation source for producing a radiation beam capable of being diffracted by the portion of the component and detected by radiation detector 20. Radiation sources that may be used include, but are not limited to, neutron sources, x-ray sources, cyclotrons, synchrotrons, and the like. The incident radiation beam may include any type of radiation beam capable of being diffracted by the portion of the component of HTMS 16 and detected by radiation detector 20. Radiation beams that may be used include, but are not limited to, neutron beams, x-ray beams, and the like. For example, radiation source 12 may be a neutron source, the incident radiation beam may be a neutron beam, and radiation detector 20 may be a neutron detector. In other examples, system 10 may omit radiation source 12, and may receive an incident radiation beam from a radiation source that is external to system 10, such as a beamline from a neutron source, an x-ray source, a cyclotron, a synchrotron, or the like.

The incident radiation beam may optionally be received by an incident beam focusing system 14. Incident beam focusing system 14 may be configured to focus the incident radiation beam on a gauge volume corresponding to the portion of the component of HTMS 16. The gauge volume may represent the volume of the component that is irradiated by the incident radiation beam and whose diffracted radiation beam is detected by radiation detector 20. For example, the portion of the component may be a parallelepiped volume within the component a selected volume having dimensions in an x-axis, y-axis, and z-axis. As will be explained below, the gauge volume of the component may be defined by a focused incident radiation beam and a focused diffracted radiation beam. In some examples, the gauge volume gauge volume may be about 1 cm$^3$.

Incident beam focusing system 14 may include any system or device that is configured to substantially restrict a cross-sectional area of a radiation beam to or from the gauge volume corresponding to the portion of the component. Systems or devices that may be used include, but are not limited to, apertures, slits, lens, slots, orifices, and the other systems and devices configured to confine a radiation beam in at least one dimension.

Incident beam focusing system 14 may be configured to receive an incident radiation beam from radiation source 12 and focus the incident radiation beam on the portion of the component of HTMS 16. In some examples, incident beam focusing system 14 may focus the incident radiation beam by confining the incident radiation beam to a focused incident radiation beam. The focused incident radiation beam may define at least one boundary of the gauge volume corresponding to the portion of the component. For example, in the example above, the focused incident radiation beam may define an x-axis and y-axis boundary of the 1 cm$^3$ portion of the component.

In some examples, incident beam focusing system 14 may include an incidence aperture. The incidence aperture may be positioned to intersect the incident radiation beam and restrict the incident radiation beam in two axes (Cartesian coordinate) or one axis (polar coordinate). For example, in the example above, the incidence aperture of incident beam focusing system 14 may be positioned such that the focused incident radiation beam is an elongated pyramid-shaped beam having a cross-section of about 1 cm$^2$ at a location corresponding to the 1 cm$^3$ portion of the component.

In some examples, incident beam focusing system 14 may be configured to focus the incident radiation beam on the portion of the component by changing a relative distance between the incidence aperture and at least one of the portion of the component and neutron source 12. Incident beam focusing system 14 may include equipment that changes a distance between the incidence aperture and at least one of neutron source 12 and HTMS 16. Equipment that may be used includes, but is not limited to, tracks, gantry systems, actuators, hydraulic positioning arms, and any other equipment that may be coupled to one of neutron source 12, HTMS 16, and/or the incidence aperture and operated to change a distance between the incidence aperture and at least one of neutron source 12 and HTMS 16.

In some examples, incident beam focusing system 14 may be configured to focus the incident radiation beam on the portion of the component by changing a size or shape of the incidence aperture. Incident beam focusing system 14 may include equipment that changes a spacing in the incidence aperture. Equipment that may be used includes, but is not limited to, slits, lenses, slots, orifices, or the like. For example, incident aperture may include a telescoping orifice that is configured to increase or decrease a diameter of the orifice in response to a focusing controller, such as controller 22.

The focused incident radiation beam exits from incident beam focusing system 14 and is directed to HTMS 16. The focused incident radiation beam may be incident on or through a section of HTMS 16. Material in the irradiated section of HTMS 16 may include crystalline or lattice planes separated by an interplanar distance (d). Radiation having a wavelength (λ) that is comparable to the interplanar distance (d) may be scattered by atoms of the material at a scattering angle (θ) that produces constructive interference corresponding to a higher flux of radiation. A radiation wavelength subject to constructive interference may be correlated to the interplanar distance and scattering angle by Bragg's Law below:

$$\lambda = 2d \sin \theta$$

The interplanar distance of a material may be affected by a variety of factors, such as residual stress, mechanical stress, material phase, temperature, material composition, and other factors that affect structure of the material. For example, as a material heats, the interplanar distance between atoms of a crystalline material increases. Correspondingly, the scattering angle for a particular wavelength of radiation may change as temperature increases.

The incident radiation beam impinging on the material may produce a resulting diffracted radiation beam. The diffracted radiation beam for the section of HTMS 16 may have a diffraction pattern represented by radiation flux that varies based on scattering angle for a radiation beam including a single wavelength or energy for a radiation beam including multiple wavelengths. The diffraction pattern may represent an average diffraction pattern for the section of HTMS 16 for the gauge volume. Correspondingly, the diffraction pattern of the section of HTMS 16 may correspond to an average interplanar distance (d) of the material in the section of HTMS 16.

System 10 may further optionally include diffracted beam focusing system 18 to further define the gauge volume of a component of HTMS 16 for which the temperature is to be determined. Diffracted beam focusing system 18 may include any system or device that is configured to substantially restrict a cross-sectional area of a radiation beam from the gauge volume corresponding to the focal portion of the component. Systems or devices that may be used include, but are not limited to, apertures, slits, lens, slots, orifices, and the other systems and devices configured to confine a radiation beam in at least one dimension.

Diffracted beam focusing system 18 may be configured to receive the diffracted radiation beam from the portion of the component and focus the diffracted radiation beam from the portion of the component on radiation detector 20. In some examples, diffracted beam focusing system 18 may focus the diffracted radiation beam by confining the diffracted radiation beam to a focused diffracted radiation beam corresponding to the portion of the component of HTMS 16. The focused diffracted radiation beam may define at least one boundary of the gauge volume corresponding to the portion of the component, such that the combination of the boundary defined by the focused incident radiation beam and the boundary defined by the focused diffracted radiation beam may result in a defined gauge volume of the component that is both irradiated and detected. For example, in the example above, the focused diffracted radiation beam may define a z-axis boundary which, when combined with the x-axis and y-axis boundaries of the focused incident radiation beam, forms the 1 cm$^3$ portion of the component.

In some examples, diffracted beam focusing system 18 may include a diffraction aperture. The diffraction aperture may be positioned to intersect the diffracted radiation beam and restrict the diffracted radiation beam in two axes (Cartesian coordinate) or one axis (polar coordinate). For example, in the example above, the diffraction aperture of diffracted beam focusing system 18 may be positioned such that only the portion of the diffracted radiation beam having a cross-section of about 1 cm$^2$ at a location corresponding to the 1 cm$^3$ portion of the component may be incident on radiation detector 20.

In some examples, diffracted beam focusing system 18 may be configured to focus the diffracted radiation beam on radiation detector 20 by changing a relative distance between the diffraction aperture and at least one of the portion of the component and radiation detector 20. Diffracted beam focusing system 18 may include equipment that changes a distance between the diffraction aperture and at least one of HTMS 16 and radiation detector 20. Equipment that may be used includes, but is not limited to, tracks, gantry systems, actuators, hydraulic positioning arms, and any other equipment that may be coupled to one of radiation detector 20, HTMS 16, and/or the diffraction aperture and operated to change a distance between the diffraction aperture and at least one of HTMS 16 and radiation detector 20.

In some examples, diffracted beam focusing system 18 may be configured to focus the diffracted radiation beam on radiation detector 20 by changing a size or shape of the diffraction aperture. Diffracted beam focusing system 18 may include equipment that changes a spacing in the diffraction aperture. Equipment that may be used includes, but is not limited to, slits, lenses, slots, orifices, or the like. For example, diffraction aperture may include a telescoping orifice that is configured to increase or decrease a diameter of the orifice in response to a focusing controller, such as controller 22.

In some examples, diffracted beam focusing system 18 may be configured to focus the diffracted radiation beam on radiation detector 20 at a variety of diffraction angles. For example, as will be explained below, a diffraction pattern may be detected by detecting intensities of the diffracted radiation beam at a wavelength for various diffraction angles. Diffracted beam focusing system 18 may include equipment that changes an angular relationship between the focused incident radiation beam and the focused diffracted radiation beam to position radiation detector 20 at different diffraction angles from the focused incident radiation beam, such as by moving in an x-axis, y-axis, or z-axis, rotating, or the like. In some examples, the equipment may include movement equipment for moving the diffraction aperture and radiation detector 20. Equipment that may be used includes, but is not limited to, tracks, gantry systems, actuators, and any other equipment that may be coupled to one of radiation source 12, radiation detector 20, HTMS 16, and/or the incidence and diffraction apertures and operated to change a diffraction angle between the focused incident radiation beam and the focused diffracted radiation beam.

In some examples, the portion of the component may be a portion of a rotating component, such as a turbine blade. To obtain an accurate measurement of the diffraction pattern of the focal portion of the component, detection and/or evaluation of the diffracted radiation beam may be limited to interactions or signals corresponding to the rotating component. For example, a turbine blade may include an oscillating intersection of the incident radiation beam, which may produce an oscillating diffracted radiation beam from the turbine blade. The diffraction pattern of the section of the turbine blade should not include material or gaps between the turbine blades.

In some examples, incident beam focusing system 14, diffracted beam focusing system 18, or both may include a gating device for gating portions the diffracted radiation beam that are not associated with the portion of the rotating component from reaching radiation detector 20. The gating device may be synchronized with the rotating component, such that the gating device allows through the incident radiation beam to or the diffracted radiation beam from the portion of the rotating component and blocks the incident radiation beam that is not to or the diffracted radiation beam that is not from the focal portion of the component. In some examples, the gating device may be configured to receive a gating signal, such as from gating instrumentation or a controller of HTMS 16, and synchronize a gating mechanism of the gating device based on the gating signal. For example, the gating signal may include positional information corresponding to a position of the rotating component. Gating devices that may be used include, but are not limited to, choppers, blockers, and the like.

In some examples, incident beam focusing system 14, diffracted beam focusing system 18, or both may include instrumentation configured to generate a gating signal that includes positional information of the rotating component. In some examples, the gating signal may be used by controller 22 to limit evaluation of the diffraction pattern to the portion of the rotating component. In some examples, the gating signal may be used by the gating device to synchronize the allowance and blockage of the gating device with the intersection of the incident radiation beam by the rotating component. The instrumentation may include any equipment that may determine positional information of the rotating component. Instrumentation that may be used includes, but is not limited to, magnetic detectors, proximity detectors, laser detectors, and the like. For example, incident beam focusing system 14, diffracted beam focusing system 18, or both may include a laser detector that directs a laser at one or more turbine blades of HTMS 16 to generate positional information of the one or more turbine blades that may be used to generate a gating signal to the gating device or cause controller 22 to omit particular diffraction information from the received diffraction pattern.

System 10 includes radiation detector 20. Radiation detector 20 may be configured to receive the diffracted radiation beam from the irradiated section of HTMS 16 and detect a diffraction pattern of the irradiated section of HTMS 16. Radiation detector 20 may include any radiation detector configured to detect the type of radiation of the diffracted radiation beam including, but not limited to, neutron detectors, x-ray detectors, and the like. In some examples, radiation detector 20 may be configured to detect a flux of radiation from the diffracted radiation beam. For example, an active detection area of radiation detector 20 may receive the focused diffracted radiation beam on the active detection area and detect a rate of radiation events incident on the active detection area. The shape of the diffracted radiation beam may vary depending on crystal structure of the material of the component. For example, a single crystal alloy may produce a diffraction spot, while a polycrystalline alloy may produce a diffraction ring.

In some examples, radiation detector 20 may be an energy discriminating radiation detector configured to detect an intensity of the diffracted radiation beam at various energies. For example, if the incident radiation beam is a polychromatic beam, energy (E) may be related to wavelength (λ), Planck's constant (h), and the speed of light (c) according to the photon energy equation below:

$$E=hc/\lambda$$

In some examples, system 10 may include one or more filters for restricting a wavelength of at least one of the incident radiation beam and the diffracted radiation beam. For example, a monochromatic filter may restrict detection of a polychromatic diffracted radiation beam by radiation detector 20 to a particular wavelength. A monochromatic filter may be coupled to, for example, radiation source 12, radiation detector 20, and/or focusing system 14, or may be present as a standalone unit.

The diffraction pattern of the diffracted radiation beam may represent average diffraction properties of the gauge volume of HTMS 16, due to the presence of incident beam focusing system 14, diffracted beam focusing system 18, or both. Absent incident beam focusing system 14 and diffracted beam focusing system 18, the diffraction pattern may represent average diffraction properties of the irradiated section of HTMS 16, which may include a surface and a subsurface volume of the section of HTMS 16. However, the properties that influence the interplanar spacing of material in the section of HTMS 16—residual stress, mechanical stress, temperature, and the like—may not be uniform throughout the section of HTMS 16. For example, the temperature may vary significantly between the surface and the subsurface volume, such that an average measurement may not adequately represent the temperature profile of the volume. Hence, the presence of incident beam focusing system 14, diffracted beam focusing system 18, or both may allow selection of the gauge volume and more accurate measurement of diffraction properties associated with selected portions of the component of HTMS 16 (e.g., the gauge volume).

System 10 includes controller 22. Controller 22 may include any one or more of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like.

Controller 22 may be configured to receive the diffraction pattern from radiation detector 20 and determine a temperature of the gauge volume of the component based on the diffraction pattern. In some examples, controller 22 may receive the diffraction pattern from radiation detector 20 in two or more signals. For example, the diffraction pattern may include respective intensities at a plurality of diffraction angles, such that controller 22 may receive a signal representing a respective intensity for each of the plurality of diffraction angles.

Controller 22 also may be communicatively coupled to and configured to control other components of system 10. For example, controller 22 may control positions and/or sizes of the incidence and diffraction apertures of incident beam focusing system 14, diffracted beam focusing system 18, or both. In some examples, controller 22 may be communicatively coupled to systems outside system 10. For example, controller 22 may be communicatively coupled to systems that provide information for determining the temperature from the diffraction pattern, such as test information related to correlations between diffraction spacing and temperature for various materials associated with the component. In other examples, controller 22 may include a memory that stores information for determining the temperature from the diffraction pattern, such as test information related to correlations between diffraction spacing and temperature for various materials associated with the component. Further operation of controller 22 will be described in FIGS. 2 and 3 below.

System 10 may be used to determine temperature and other properties related to interplanar spacing, such as residual stress, mechanical stress, or the like, for a variety of focal volumes in HTMS 16. In some examples, system 10 may be configured to determine a temperature of a subsurface portion of a component within HTMS 16 based on a diffraction pattern. For example, the incident radiation beam may be a neutron beam or x-ray beam capable of penetrating HTMS 16. While other temperature measurements, such as infrared, may limit the evaluated portion of the component to a surface or other line-of-sight portion, system 10 may evaluate any volume within HTMS 16. As a result, an accurate temperature profile of the system may be determined. In addition to subsurface gauge volumes, system 10 may control the size of the gauge volume using incident beam for the portion of the component. For example, for a high-resolution temperature profile, system 10 may evaluate a 1000 $cm^3$ volume by evaluating 1000 smaller volumes within the 1000 $cm^3$ volume. For a faster, lower resolution temperature profile, system 10 may evaluate the same 1000 $cm^3$ volume using fewer measurements, such as a single measurement. By controlling a depth and/or size of the portion of the component evaluated, system 10 may provide an accurate temperature profile of a component of HTMS 16.

Figure 2:
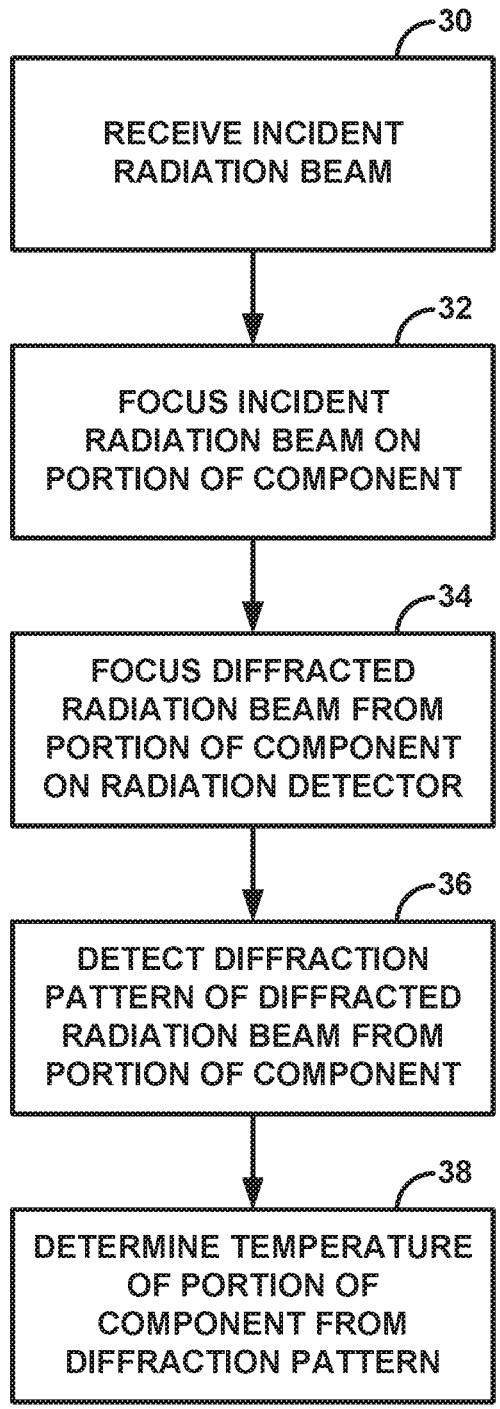
FIG. 2 is a flow diagram illustrating an example technique for determining a temperature of a portion of a component using radiation diffraction.

FIG. 2 is a flow diagram illustrating an example technique for determining a temperature of a focal portion of a component using focused radiation diffraction. The technique of FIG. 2 will be described with concurrent reference to system 10 of FIG. 1, although one of ordinary skill will understand that the technique of FIG. 2 may be performed by other systems that include more or fewer components, and that system 10 may perform other techniques. For example, one or more control steps performed by controller 22 may be performed manually or by using another component of system 10.

Controller 22 may cause incident beam focusing system 14 to receive an incident radiation beam from radiation source 12 (30). For example, controller 22 may send a signal to a gantry system coupled to an incidence aperture to move the incidence aperture of incident beam focusing system 14 to intersect the incident radiation beam. In some examples, controller 22 may control neutron source 12 to produce, or incident beam focusing system 14 to select, an incident radiation beam based on the composition of the portion of the component and/or the position of the portion of the component within the component or HTMS 16. Certain materials may respond differently to different types of radiation, such that a material may diffract a first type of radiation in a way that is more difficult to detect than a second type of radiation. Factors that may be used to select an incident radiation beam include, but are not limited to, radioactivity of the component, volume of the component, penetrating power of the radiation type, ability of the component to diffract the type of radiation, and the like. For example, titanium may diffract an incident neutron beam in a way that results in a negative diffraction, while titanium may diffract an incident x-ray beam in a way that results in positive diffraction, which may be easier to detect than negative diffraction.

Controller 22 may cause incident beam focusing system 14 to focus the incident radiation beam on a portion of a component of HTMS 16 (32). For example, a user may input focal volume coordinates and a focal volume resolution to controller 22 and, in response, controller 22 may control positions and configurations of components of incident beam focusing system 14 to focus the incident radiation beam on the focal volume coordinates at the desired focal volume resolution. In some examples, controller 22 may cause incident beam focusing system 14 to focus the incident radiation beam on the portion of the component by changing a relative distance between the portion of the component and the incidence aperture or radiation source 12 and the incidence aperture. For example, controller 22 may send a control signal to a gantry system of incident beam focusing system 14 to move the incidence aperture closer to HTMS 16 and further from radiation source 12 to focus the incident radiation beam on a smaller portion of a component of HTMS 16. In some examples, controller 22 may cause incident beam focusing system 14 to focus the incident radiation beam on the focal portion of the component by changing a size or shape of the incidence aperture. For example, controller 22 may send a control signal to the incidence aperture of incident beam focusing system 14 to reduce a diameter of an orifice of the incidence aperture to focus the incident radiation beam on a smaller portion of a component of HTMS 16.

In some examples, such as components having coatings, controller 22 may cause incident beam focusing system 14 to focus the incident radiation beam on a portion of the component of HTMS 16 at an incidence angle associated with grazing incidence diffraction. For example, grazing incidence diffraction may be sensitive to a surface of the component and may have a diffracted radiation beam that is easier to detect by radiation detector 20. Controller 22 may cause incident beam focusing system 14 to focus the incident radiation beam at an incident angle close to a critical angle of the coating.

In addition to, or as an alternative to, causing incident beam focusing system 14 to focus the incident radiation beam (32), controller 22 may cause diffracted beam focusing system 18 to focus the diffracted radiation beam from the portion of the component on radiation detector 20 (34). For example, in the example above, in response to the focal volume coordinates and focal volume resolution, controller 22 may control positions and configurations of components of diffracted beam focusing system 18 to focus the diffracted radiation beam on the focal volume coordinates at the desired focal volume resolution. In some examples, controller 22 may cause diffracted beam focusing system 18 to focus the diffracted radiation beam from the focal portion of the component on radiation detector 20 by changing a relative distance between the diffraction aperture and at least one of the focal portion of the component and radiation detector 20. For example, controller 22 may send a control signal to a gantry system of diffracted beam focusing system 18 to move the diffraction aperture closer to radiation detector 20 and further from HTMS 16 to focus the diffracted radiation beam on a smaller portion of a component of HTMS 16. In some examples, controller 22 may cause diffracted beam focusing system 18 to focus the diffracted radiation beam on radiation detector 20 by changing a size or shape of the diffraction aperture. For example, controller 22 may send a control signal to the diffraction aperture of diffracted beam focusing system 18 to reduce a diameter of an orifice of the diffraction aperture to focus a smaller portion of the diffracted radiation beam on radiation detector 20.

In some examples, controller 22 may cause diffracted beam focusing system 18 to focus the diffracted radiation beam from a focal portion of a rotating component on radiation detector 20 by gating the diffracted radiation beam to limit the diffracted radiation beam detected by radiation detector 20 to only the focal portion of the rotating component. For example, controller 22 may send control signals to a gating device positioned between the focal portion of the component and radiation detector 20 to allow through the diffracted radiation beam from the focal portion of the rotating component and block the diffraction radiation beam that is not from the focal portion of the rotating component. Controller 22 may synchronize the gating device of diffracted beam focusing system 18 with the rotating component, such as by receiving gating signals from HTMS 16 or gating instrumentation that contain positional information and sending spatial control signals to the gating device. In other examples, the gating device may instead be part of incident beam focusing system 14.

Controller 22 may cause radiation detector 20 to detect a diffraction pattern of the diffracted radiation beam from the portion of the component (36). A diffraction pattern may represent a distribution of intensities at one or more diffraction angles or energies. Controller 22 may be configured to receive one or more signals representing intensities which, combined with the diffraction angles or energies of the diffracted radiation beam, may form the diffraction pattern of the portion of the material. In examples where the component includes a single crystal alloy, controller 22 may cause radiation detector 20 to detect a diffraction spot, while in examples where the component include a polycrystalline alloy, controller 22 may cause radiation detector 20 to detect a diffraction ring.

In some examples, the incident radiation beam may be a monochromatic beam, and radiation detector 20 may be configured to detect a diffraction pattern that includes a distribution of intensities of the diffracted radiation beam at various diffraction angles for a wavelength associated with the monochromatic beam. Controller 22 may cause diffracted beam focusing system 18 to position radiation detector 20 at various diffraction angles associated with the wavelength of the monochromatic beam, or radiation detector 20 may be sized to span a range of diffraction angles. Controller 22 may cause radiation detector 20 to detect the diffraction pattern by detecting an intensity of the diffracted radiation beam at each of the various diffraction angles. Controller 22 may receive a diffraction pattern of the diffracted radiation beam by receiving an intensity signal of the monochromatic diffracted radiation beam at each diffraction angle.

In some examples, the incident radiation beam may be a polychromatic beam, and radiation detector 20 may be configured to detect a diffraction pattern that includes a distribution of intensities of the diffracted radiation beam at energies associated with a diffraction angle of the polychromatic beam. Controller 22 may cause diffracted beam focusing system 18 to position radiation detector 20 at a diffraction angle and cause radiation detector 20 to detect an intensity of the diffracted radiation beam at various energies. Controller 22 may cause radiation detector 20 to detect the diffraction pattern by detecting an intensity of the diffracted radiation beam at each of the various diffraction energies (e.g., wavelengths). Controller 22 may a receive a diffraction pattern of the diffracted radiation beam by receiving an intensity signal of the polychromatic diffracted radiation beam at each energy.

Controller 22 may determine a temperature of the portion of the component based on the diffraction pattern (38). In some examples, controller 22 may determine at least one diffraction peak for the diffraction pattern. The diffraction peak may represent an intensity at the scattering angle or energy corresponding to constructive interference caused by the interplanar spacing. Controller 22 may determine the interplanar spacing based on the diffraction peak. Controller 22 may determine a property of the portion of the component, such as temperature, residual stress, or mechanical stress, based on the interplanar spacing.

In some examples, the diffraction pattern may include a set of intensities for various diffraction angles for a diffracted radiation beam having a single wavelength. Controller 22 may determine at least one intensity peak of the diffraction pattern. The intensity peak may correspond to the diffraction angle corresponding to constructive interference caused by the interplanar spacing. Controller 22 may determine the interplanar spacing from the wavelength ($\lambda$) and peak diffraction angle ($\theta_p$), such as according to the following equation:

$$d = \frac{2\lambda}{\sin\theta_p}$$

In some examples, the diffraction pattern may include a set of intensities for a diffraction angle at various energies. Controller 22 may determine at least one intensity peak of the diffraction pattern. The intensity peak may correspond to the peak energy of the constructive interference caused by the interplanar spacing. Controller 22 may determine the interplanar spacing from the peak energy ($E_p$) and the diffraction angle ($\theta$), such as according to the following equation:

$$d = \frac{2hc}{E_p \sin\theta}$$

Figure 3:
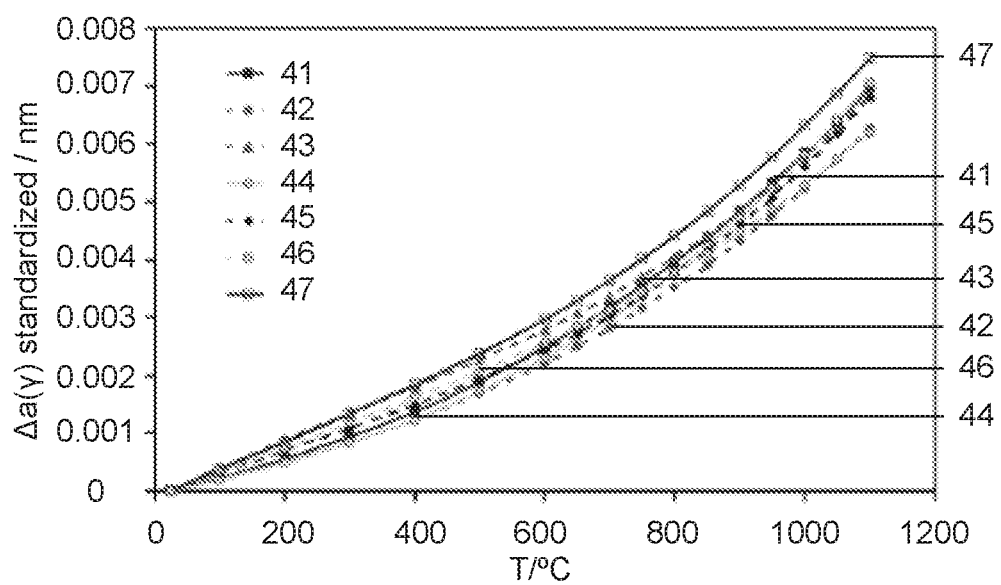
FIG. 3 is a graph of a lattice constant corresponding to interplanar spacing as a function of temperature for various metal alloys.

Controller 22 may determine the temperature of the portion of the material based on the interplanar spacing. As discussed above, the interplanar spacing may be correlated to temperature. FIG. 3 is a graph of a lattice constant corresponding to interplanar spacing as a function of temperature for various metal alloys 41-47. As shown in FIG. 3, the interplanar spacing for each alloy may generally increase monotonically with increasing temperature, such that a given alloy may have a generally 1:1 relationship between interplanar spacing and temperature. In some examples, controller 22 may receive information relating interplanar spacing to temperature and use the information to determine the temperature of the portion of the material. Information may include, but is not limited to, equations, tables, and the like. In other examples, controller 22 may include a memory device that stores information relating interplanar spacing to temperature and use the information to determine the temperature of the portion of the material.

In some examples in which controller 22 is determining a property of a rotating component, controller 22 may receive the diffraction pattern and a gate signal for a rotating component and limit determination of the temperature based on the diffraction pattern based on the gate signal. For example, the gate signal may provide controller 22 with positional information about the portion of a rotating component, such as phase and rotations per minute. Controller 22 may receive the positional information associated with the rotating component and select a portion of the diffraction pattern based on the positional information of the rotating component. For example, controller 22 may gate the intensity signals associated with the diffraction pattern based on the positional information of the gate signal. In some example, controller 22 may use software to select the portion of the diffraction pattern based on the positional information of the rotating component. In some examples, controller 22 may receive the gate signal from gating instrumentation, while in other examples, controller 22 may receive the gate signal from HTMS 16, such as a controller.

In some examples, controller 22 may determine the temperature of the portion of the component based on a difference between the diffraction contribution of temperature and a diffraction contribution of mechanical stresses. In addition to temperature, mechanical stress may affect the interplanar spacing of the portion of the component. To accurately determine the temperature of the portion of the component, controller 22 may be configured to determine the diffraction contribution of mechanical stresses on the portion of the component.

In some examples, controller 22 may receive information related to mechanical stress of the component of HTMS 16 and determine the contribution of mechanical stress based on the information. For example, the information related to mechanical stress may include test data from the component of HTMS 16 under conditions that are substantially similar to the conditions under which the diffraction pattern was detected.

Figure 4:
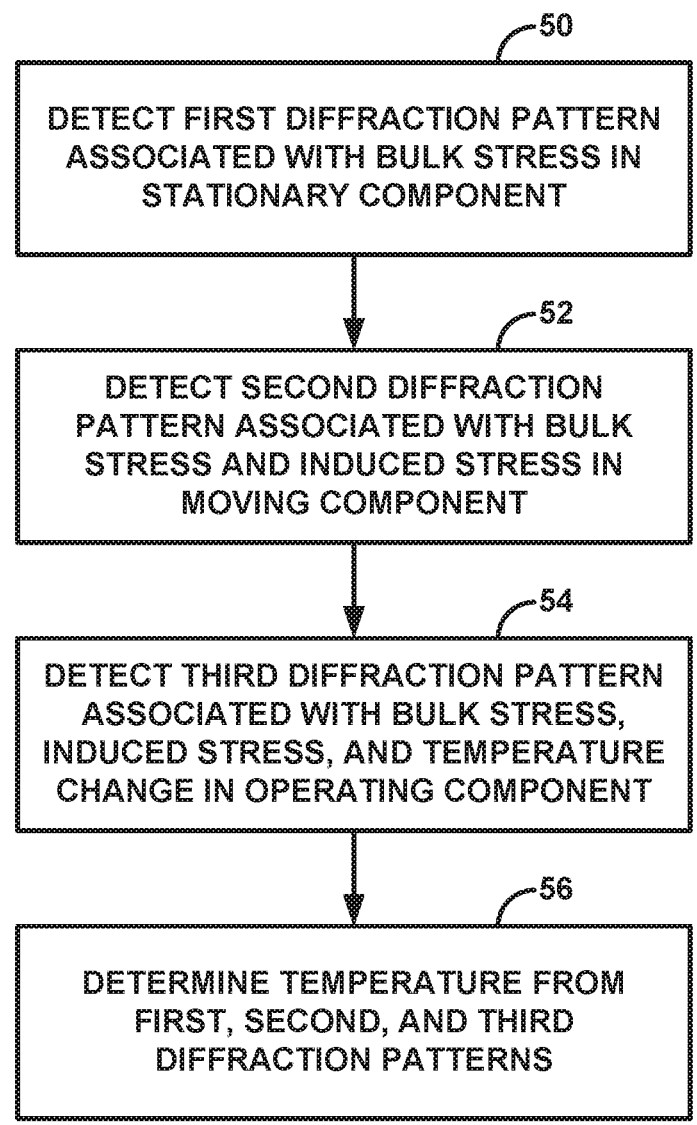
FIG. 4 is a flow diagram illustrating an example technique for determining a temperature of a portion of a component that includes mechanical stresses using radiation diffraction.

In some examples, controller 22 may determine the temperature of the portion of the component by evaluating the portion of the component at various operating conditions, determining mechanical stresses at the various operating conditions, and determining a contribution of temperature to the diffraction pattern based on the determined mechanical stresses. FIG. 4 is a flow diagram illustrating an example technique for determining a temperature of a portion of a component that includes mechanical stresses using focused radiation diffraction.

Controller 22 may cause radiation detector 20 to detect a first diffraction pattern from the portion of the component while the component is stationary and at a known temperature (50). For example, controller 22 may cause radiation detector 20 to detect the first diffraction pattern as described in FIG. 2 above. The first diffraction pattern may be associated with a bulk stress of the portion of the component that is present when the component is stationary and at the known temperature. Bulk stresses may include, for example, residual stress on the component. For example, a component may have a base interplanar spacing associated with no bulk stresses at a known temperature. Controller 22 may determine the base interplanar spacing, such as from a reference, calibration curve, or equation. Controller 22 may determine a first interplanar spacing from the first diffraction pattern at the known temperature and subtract the base interplanar spacing from the first interplanar spacing to determine a portion of the first interplanar spacing attributable to bulk stresses.

Controller 22 may cause radiation detector 20 to detect a second diffraction pattern from the portion of the component while the component is operating at a known temperature (52). The second diffraction pattern may be associated with the bulk stress from the first diffraction pattern and an induced mechanical stress of the portion of the component that is present when the component is moving at the known temperature. For example, controller 22 may determine a second interplanar spacing from the second diffraction pattern at the known temperature. Controller 22 may subtract the portion of the first interplanar spacing attributable to bulk stresses from the second interplanar spacing to determine a portion of the second interplanar spacing attributable to induced stresses.

Controller 22 may cause radiation detector 20 to detect a third diffraction pattern from the portion of the component when the component is operating and at an unknown temperature (54). The third diffraction pattern may be associated with the bulk stress from the first diffraction pattern, the induced mechanical stress from the second diffraction pattern, and a temperature of the portion of the component that are present when the component is operating at an unknown temperature. For example, controller 22 may determine a third interplanar spacing from the third diffraction pattern at the unknown temperature. Controller 22 may subtract the portion of the interplanar spacing attributable to residual and induced stress from the third interplanar spacing to determine a portion of the interplanar spacing attributable to temperature.

Controller 22 may be configured to determine the temperature of the portion of the component based on the first diffraction pattern, the second diffraction pattern, and the third diffraction pattern (56). In some examples, controller 22 may determine a diffraction contribution of bulk stress based on the first diffraction pattern, a diffraction contribution of induced stress based on the bulk stress and the second diffraction pattern, and a diffraction contribution of temperature based on the bulk stress, the induced stress, and the third diffraction pattern, such as described above. For example, controller 22 may determine a portion of the interplanar spacing attributable to temperature, as described above. Controller 22 may determine a temperature from the portion of the interplanar spacing attributable to temperature, such as through a calibration curve or other reference or equation correlating temperature to interplanar spacing.

Referring back to FIG. 2, in some examples, controller 22 may determine an operating temperature profile of the portion of the component of HTMS 16 based on temperatures of the portion of the component at different times and/or operating conditions. For example, controller 22 may communicate with HTMS 16, such as a controller of HTMS 16. Controller 22 may cause radiation detector 20 to detect diffraction patterns of the diffracted radiation beam from the focal portion of the component at a variety of operating conditions. Controller 22 may determine a temperature of the portion of the component at each of the variety of operating conditions based on the corresponding diffraction pattern. Controller 22 may determine a temperature profile of the focal portion of the component that represents temperatures of the portion of the component at the various operating conditions. In some examples, controller 22 may determine or verify a model for predicting temperatures of a component of a high temperature mechanical system under various operating conditions based on the temperatures of the portion of the component under various operating conditions. For example, controller 22 may be an adaptive controller configured to adapt a real-time engine model based on temperatures of the portion of the component.

In some examples, controller 22 may determine a spatial temperature profile of the component of HTMS 16 based on temperatures from a plurality of portions of the component. For example, controller 22 may cause focusing system 14 to focus the incident radiation beam on a second portion of the component and focus a diffracted radiation beam from the second portion of the component on radiation detector 20. Controller 22 may cause radiation detector 20 to detect a diffraction pattern of the diffracted radiation beam from the second portion of the component. Controller 22 may determine a temperature of the second portion of the component based on the diffraction pattern.

Figure 5A:
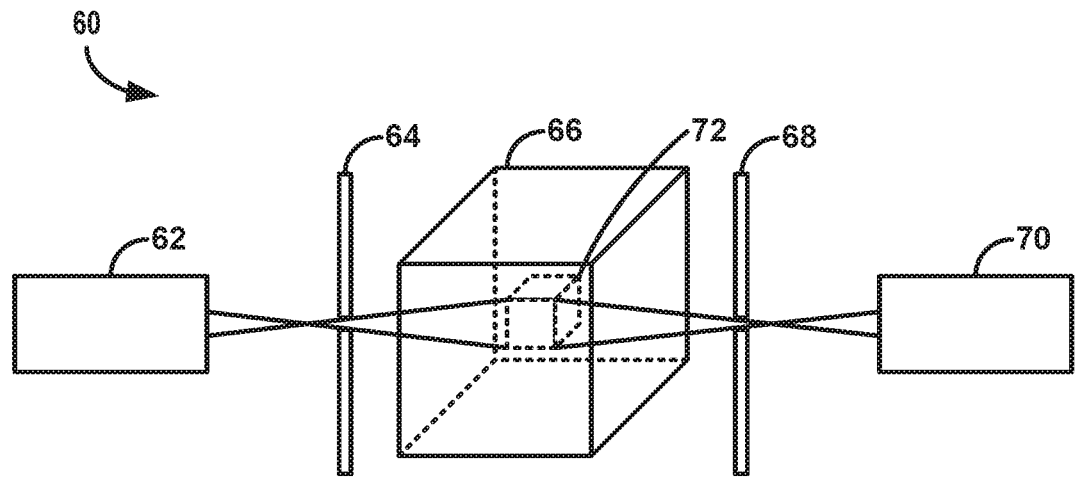
FIG. 5A is a diagram of an example system for determining a temperature of a portion of a component using radiation diffraction.

FIG. 5A is a diagram of an example system for determining a temperature of a portion of a component using radiation diffraction. Components of the system 60 of FIG. 5A may correspond to similar or equivalent components of FIG. 1. For example, a radiation source 62, an incident beam focusing system 64, a HTMS 66, a diffracted beam focusing system 68, a radiation detector 70, and a controller (not shown) may correspond to radiation source 12, incident beam focusing system 14, HTMS 16, diffracted beam focusing system 18, radiation detector 20, and controller 22 of FIG. 1.

Incident beam focusing system 64 may receive an incident radiation beam from radiation source 62 and focus the incident radiation beam on a focal portion 72 of a component of HTMS 66. The incident radiation beam scatters from focal portion 72 of the component as a diffracted radiation beam. Diffracted beam focusing system 68 may focus the diffracted radiation beam from focal portion 72 of the component on radiation detector 70. Radiation detector 70 may detect a diffraction pattern of a diffracted radiation beam from focal portion 72 of the component. The controller may determine a temperature of focal portion 72 of the component based on the diffraction pattern.

Figure 5B:
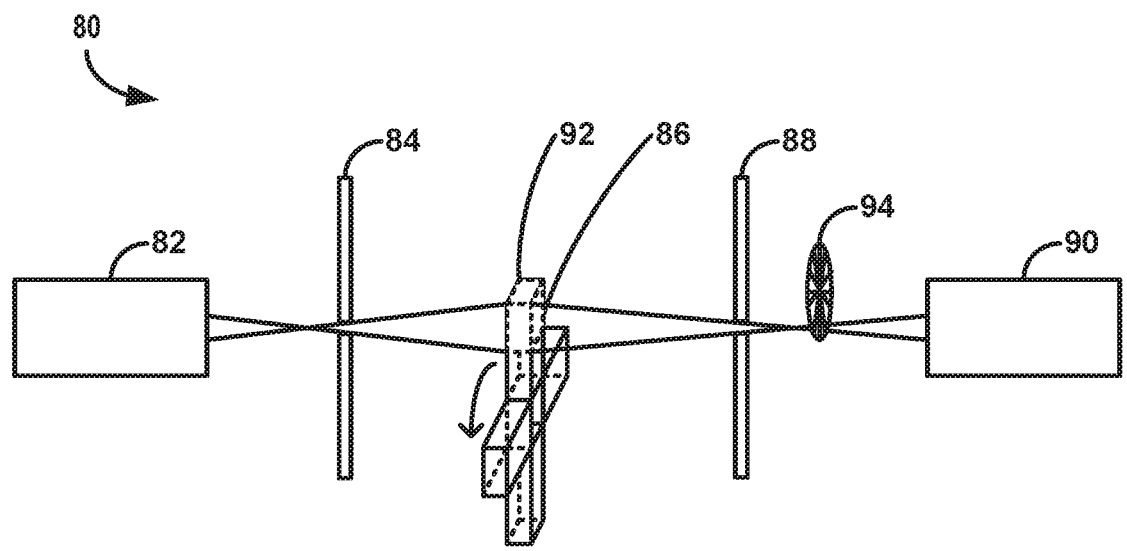
FIG. 5B is a diagram of an example system for determining a temperature of a portion of a moving component using radiation diffraction.

FIG. 5B is a diagram of an example system for determining a temperature of a portion of a rotating component using radiation diffraction. Components of FIG. 5B may correspond to similar or equivalent components of FIG. 5A. For example, a radiation source 82, an incident beam focusing system 84, a diffracted beam focusing system 88, a radiation detector 90, and a controller (not shown) may correspond to radiation source 62, incident beam focusing system 64, diffracted beam focusing system 68, radiation detector 70, and the controller (not shown) of FIG. 5A.

Incident beam focusing system 84 may receive an incident radiation beam from radiation source 82 and focus the incident radiation beam on a focal portion 92 of a rotating component 86 of a HTMS. The incident radiation beam scatters from focal portion 92 of component 86 as a diffracted radiation beam. Diffracted beam focusing system 88 may focus the diffracted radiation beam from focal portion 92 of component 86 on radiation detector 90. Diffracted beam focusing system 88 includes a gating device 94 synchronized to the rotating component 86. Gating device 94 may modulate the diffracted radiation beam according to positional information of rotating component 86. Radiation detector 90 may detect a diffraction pattern of a diffracted radiation beam from focal portion 92 of rotating component 86. The controller may determine a temperature of focal portion 92 of rotating component 86 based on the diffraction pattern.

Various examples have been described. These and other examples are within the scope of the following claims.

What is claimed is:

1. A method, comprising:
   receiving, by a focusing system, an incident radiation beam from a radiation source, the radiation source including at least one of an x-ray source or a neutron source, wherein the incident radiation beam comprises an x-ray beam or a neutron beam;
   focusing, using the focusing system, the incident radiation beam on a portion of a component of a high temperature mechanical system, wherein the incident radiation beam scatters as a diffracted radiation beam from the portion of the component;
   focusing, using the focusing system, the diffracted radiation beam from the portion of the component on a radiation detector;
   detecting, by the radiation detector, a diffraction pattern of the diffracted radiation beam from the portion of the component; and
   determining a diffraction peak of the diffraction pattern;
   determining a diffraction contribution of mechanical stresses on the portion of the component; and
   determining a temperature of the portion of the component based on the diffraction peak and the diffraction contribution of the mechanical stresses.

2. The method of claim 1, wherein the portion of the component is a gauge volume of the component defined by the focused incident radiation beam and the focused diffracted radiation beam, and the temperature is an average temperature of the gauge volume of the component.

3. The method of claim 1, wherein the focusing system comprises an incidence aperture positioned to intersect the incident radiation beam and a diffraction aperture positioned to intersect the diffracted radiation beam, and wherein at least one of focusing the incident radiation beam on the portion of the component and focusing the diffracted radiation beam from the portion of the component on the radiation detector further comprises changing at least one of:
   a relative distance between the portion of the component and at least one of the incidence aperture and the diffraction aperture, or
   a size of at least one of the incidence aperture and the diffraction aperture.

4. The method of claim 1, wherein the component is a rotating component, and wherein determining the temperature of the portion of the component based on the diffraction pattern and the diffraction contribution of the mechanical stresses further comprises:
   receiving, by the controller, positional information associated with the rotating component;
   selecting, by the controller, a portion of the diffraction pattern based on the positional information of the rotating component; and
   determining, by the controller, the temperature of the portion of the rotating component based on the portion of the diffraction pattern and the diffraction contribution of the mechanical stresses.

5. The method of claim 4, further comprising gating the diffracted radiation beam with a gating device, wherein the gating device is synchronized to the rotating component.

6. The method of claim 1, wherein the incident radiation beam is a monochromatic beam and diffraction pattern includes a distribution of intensities of the diffracted radiation beam at various diffraction angles for a wavelength associated with the monochromatic beam.

7. The method of claim 1, wherein the incident radiation beam is a polychromatic beam and the diffraction pattern includes a distribution of intensities of the diffracted radiation beam at various energies for a diffraction angle.

8. The method of claim 1, wherein detecting the diffracted pattern further comprises:
   detecting a first diffraction pattern from the portion of the component while the component is stationary, the first diffraction pattern associated with a bulk stress of the portion of the component;

detecting a second diffraction pattern from the portion of the component while the component is moving, the second diffraction pattern associated with a bulk stress and an induced stress of the portion of the component; and detecting a third diffraction pattern from the portion of the component while the component is operating, the third diffraction pattern associated with a bulk stress, an induced stress, and a temperature change of the portion of the component, and wherein determining the temperature of the portion of the component further comprises determining the temperature of the portion of the component from the first diffraction pattern, the second diffraction pattern, the third diffraction pattern, and the diffraction contribution of the mechanical stresses.

9. The method of claim 1, wherein the portion of the component is beneath an outermost surface of the component.

10. The method of claim 1, wherein the incident radiation beam is a neutron beam.

11. A system, comprising:
a focusing system configured to:
receive an incident radiation beam from a radiation source, the radiation source including at least one of an x-ray source or a neutron source, wherein the incident radiation beam comprises an x-ray beam or a neutron beam;
focus the incident radiation beam on a portion of a component of a high temperature mechanical system, wherein the incident radiation beam scatters from the portion of the component as a diffracted radiation beam; and
focus the diffracted radiation beam from the portion of the component on a radiation detector;
the radiation detector configured to detect a diffraction pattern of the diffracted radiation beam from the portion of the component; and
a controller configured to:
determine a diffraction peak of the diffraction pattern;
determine a diffraction contribution of mechanical stresses on the portion of the component; and
determine a temperature of the portion of the component based on the diffraction peak and the diffraction contribution of the mechanical stresses.

12. The system of claim 11, wherein the focusing system comprises an incidence aperture positioned to intersect the incident radiation beam and a diffraction aperture positioned to intersect the diffracted radiation beam, and wherein the focusing system is configured to at least one of focus the incident radiation beam on a portion of a component and focus the diffracted radiation beam from the portion of the component on a radiation detector by changing at least one of:

a relative distance between the portion of the component and at least one of the incidence aperture and the diffraction aperture, or a size of at least one of the incidence aperture and the diffraction aperture.

13. The system of claim 11, wherein the component is a rotating component, and wherein the controller is further configured to:
receive positional information associated with the rotating component;
select a portion of the diffraction pattern based on the positional information of the rotating component; and
determine the temperature of the portion of the rotating component based on the portion of the diffraction pattern and the diffraction contribution of the mechanical stresses.

14. The system of claim 13, wherein the focusing system further comprises a gating device synchronized to the rotating component and configured to gate the diffracted radiation beam.

15. The system of claim 11, wherein the incident radiation beam is a monochromatic beam and the diffraction pattern includes a distribution of intensities of the diffracted radiation beam at various diffraction angles for a wavelength associated with the monochromatic beam.

16. The system of claim 11, wherein the incident radiation beam is a polychromatic beam and the diffraction pattern includes a distribution of intensities of the diffracted radiation beam at various energies for a diffraction angle.

17. The system of claim 11, wherein the controller is further configured to:
detect a first diffraction pattern from the portion of the component while the component is stationary, the first diffraction pattern associated with a bulk stress of the portion of the component;
detect a second diffraction pattern from the portion of the component while the component is moving, the second diffraction pattern associated with a bulk stress and an induced stress of the portion of the component;
detect a third diffraction pattern from the portion of the component while the component is operating, the third diffraction pattern associated with a bulk stress, an induced stress, and a temperature change of the portion of the component; and
determine the temperature of the portion of the component from the first diffraction pattern, the second diffraction pattern, the third diffraction pattern, and the diffraction contribution of the mechanical stresses.

18. The system of claim 11, wherein the incident radiation beam is a neutron beam.

* * * * *